INVENTORS
RICHARD L. FISCHER
ROBERT B. GOODMAN
BY Norman Friedland
ATTORNEY

INVENTORS
RICHARD L. FISCHER
ROBERT B. GOODMAN
BY Norman Friedland
ATTORNEY

United States Patent Office 3,261,406
Patented July 19, 1966

3,261,406
ATTITUDE CONTROL SYSTEM FOR AN
AERONAUTICAL PROPELLER
Robert B. Goodman, Hartford, and Richard L. Fischer, Suffield, Conn., assignors to United Aircraft Corporation, East Hartford, Conn., a corporation of Delaware
Filed May 16, 1963, Ser. No. 280,902
6 Claims. (Cl. 170—160.14)

This invention relates to aeronautical propellers and more particularly to control means for biasing a normal pitch control adapted for vertical take-off and landing aircraft (VTOL).

An object of this invention is to provide individual electrohydraulic servo units for receiving electrical signals directly from an attitude control, thus eliminating the need to transmit autopilot signals through mechanical linkages.

A further object of this invention is to provide in a device as described means for biasing a normal pitch control of a propeller in such a manner as to produce large forces in order to overcome friction and sticking of the control valve to assure high reliability.

A still further object of this invention is to provide in a device as described means for adding and subtracting to the collective pitch signal from a propeller control in order to maintain attitude control automatically in a propeller driven aircraft.

A still further object of this invention is to assure that when the autopilot is in the inoperative condition, the biasing control is nulled out so as to allow normal speed governing and manual scheduling of the blade angle through the normal control of the propeller.

A still further object of this invention is to provide in a system as described dual null positioning servo systems to allow speed governing and manual scheduling of blade angle through the normal pitch control of the propeller in order to assure safety in the event that one of the systems becomes inoperative.

In controlling the speed of the engine with a normal propeller control, it is contemplated to use an autopilot which would normally function to automatically compensate for attitude, particularly during hovering of the aircraft. In order to obtain automatic control it is necessary to generate a signal from the autopilot to the normal pitch control mechanism. A method of accomplishing this fact is to supply linkages from the autopilot to the control system, but due to the distance between the two devices, such a system is not only cumbersome but increases the weight of the overall device. We have found that by relaying an electrical signal to a proportional type of solenoid and by properly controlling a pair of tandem mounted servo systems, the normal pitch control mechanism can be biased so as to control the pitch of the propeller in order to maintain the proper attitude in accordance with the autopilot signal generated by the attitude control. It is essential in such a device to assure that the biasing system does not in any way affect the normal control when the autopilot is put in the inoperative condition. In accordance with this invention we provide a pair of servo units which receive electrical signals directly from the attitude control unit which is mounted on the propeller, wherein one of said servo units converts an electrical signal to a mechanical force output which, in turn, is used to actuate the propeller pitch change control while the other deactivates the backup null positioning system. The system is designed to transmit automatic control blade signals to the propeller which add to or subtract from the normal pitch signals from the propeller control. When the automatic pilot is placed in the off condition, the servo system is held in a nulled position to enable normal speed governing and manual scheduling of blade angle through the normal functioning of the propeller control unit. In this manner, the dual servo system concept provides maximum control reliability for null positioning so that in the event of loss of one hydraulic system or electric power, scheduling of blade angles through the normal propeller control unit is assured.

The servo system in general incorporates a torque motor or proportional solenoid, two connected, but independently powered actuators, an autopilot solenoid, a pressure actuated dumped valve and feedback elements. During autopilot operation, the solenoid is energized to dump pressure from the system of one of the actuators. The servo pressure force developed on the large area of the remaining actuator then opposes the supply pressure force acting on the small area of that same actuator. The actuators will be sized to develop sufficient "chip breaking" force capability to insure reliable propeller control. An electrical signal to the torque motor from the autopilot control causes the armature to be displaced thereby causing a change in servo pressure. This results in a force unbalance on the actuators causing them to move and the propeller blade angle to change. Actuator motion continues until the torque motor force is nulled out by the feedback spring force. An electrical feedback signal through a potentiometer is relayed back to the autopilot for returning the autopilot back into its balanced position.

With no power being delivered to the torque motor, the armatures will be in a null position when the actuator is centered. The feedback spring force then balances out the centering adjustment spring load. Thus with the autopilot off or with a loss in electric power any slight displacement of the actuator from its centered position due to the action of an external force will displace the armature and effect a servo pressure change to oppose this force. This action will recenter the actuator and hold it in an essentially fixed position, thus allowing scheduling of the blade angle through the normal propeller control. A backup actuator position control is simultaneously provided once the autopilot solenoid has been deenergized. Displacement of the actuator from its center position causes pressure to be directed to or drained from the large area piston chamber as required to develop a recentering force. Loss of backup system hydraulic power has no effect on servo system operation as position or autopilot control will be maintained by the first actuator system.

Other features and advantages will be apparent from the specification and claims and from the accompanying drawings which illustrate an embodiment of the invention.

Figure 1:
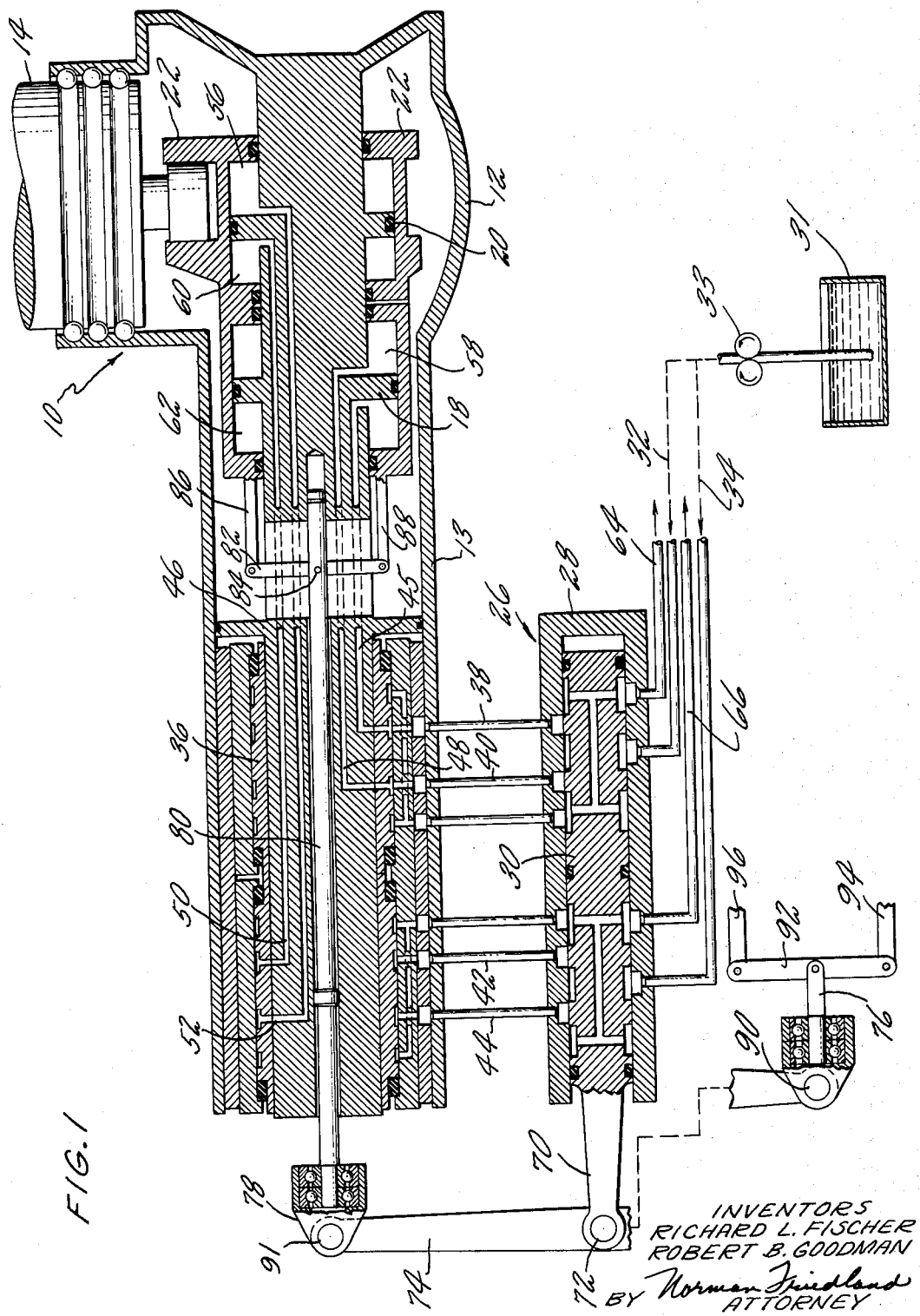
FIGURE 1 is a schematic and a partial sectional view showing a hub carrying appropriate propeller blades together with the actuating mechanism.
Figure 2:
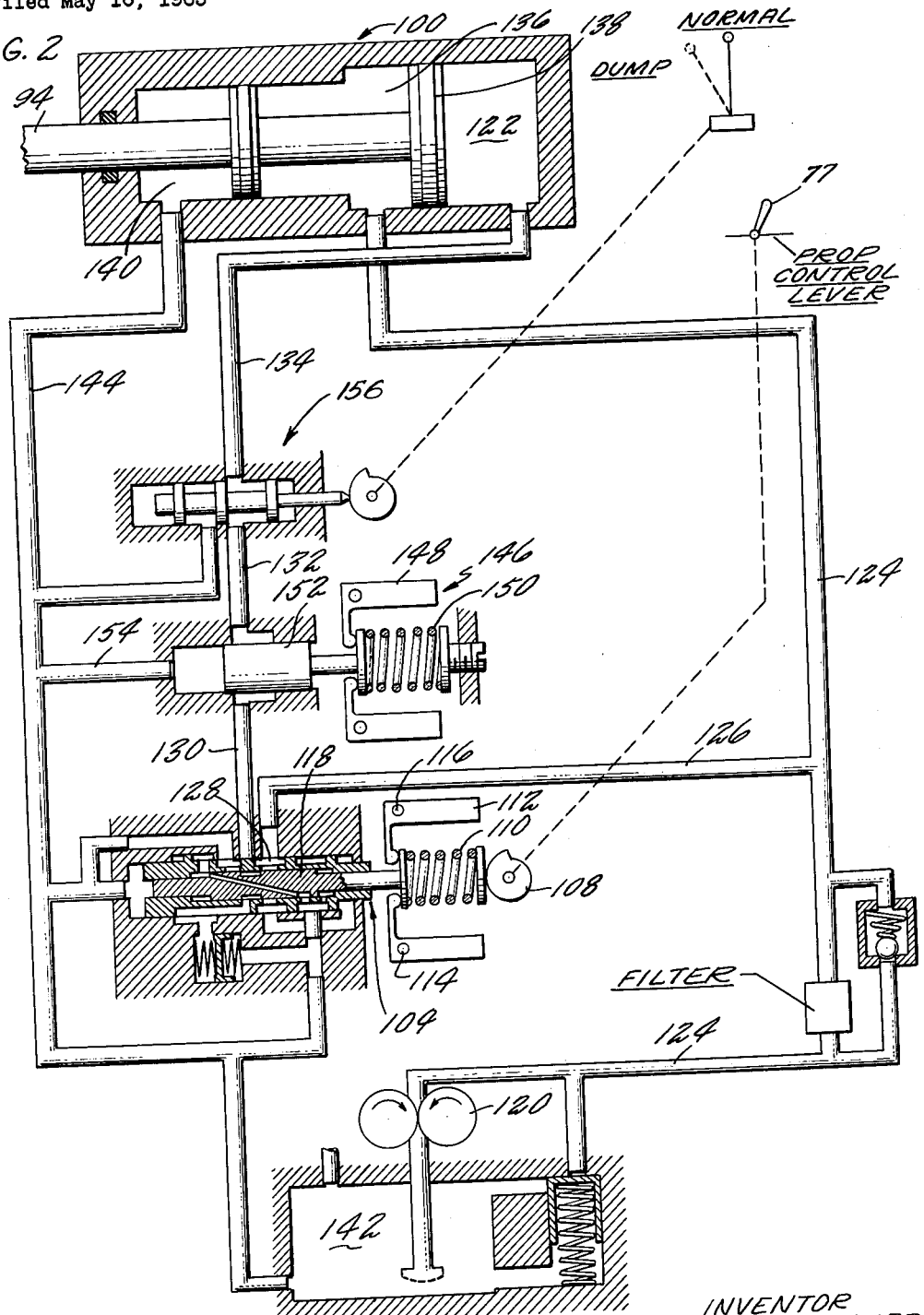
FIGURE 2 is a schematic illustrating a suitable propeller control.
Figure 3:
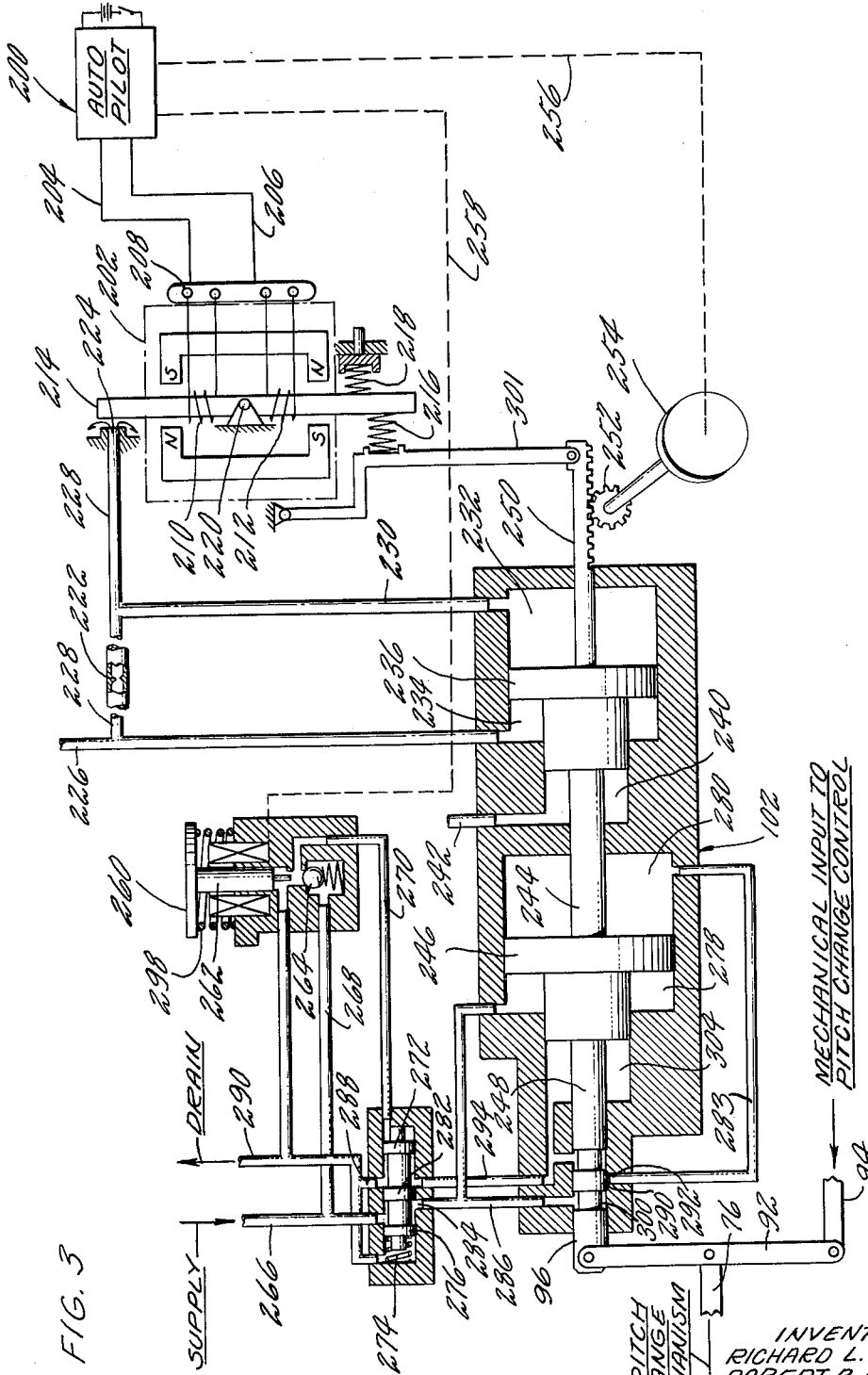
FIGURE 3 is a schematic illustration of the present invention.

Referring now particularly to FIGS. 1–3 which show a preferred embodiment of the invention for illustrating how a signal generated by an autopilot is utilized to bias the normal propeller control system, and it should be understood that the biasing means may have applicability with other types of conventional propeller systems. Thus, the illustration is for the purpose of showing a preferred embodiment and is to be undersood to be not limited thereto. As can be seen in FIG. 1, a propeller generally indicated by numeral 10 contains a hub 12 supporting a plurality of propeller blades indicated by numeral 14. While only one blade is shown in the drawing, several of these blades are circumferentially spaced about the hub and are supported in a similar manner. Integral elongated shaft 13 extends from the hub and supports suitable actuating mechanism adapted to change the pitch of the propeller blade. This is accomplished by metering pressurized fluid from a fluid pressure source into tandemly mounted pistons 18 and 20. The pistons are held stationary and are affixed to hub 12 and are surrounded by a suitable casing 22 which translates axially in accordance with the fluid pressure admitted into the chambers formed on either side of pistons 18 and 20. A yoke extending from casing 22 engages an eccentric crank arm mounted on the root of the propeller blades which serves to rotate the blade about its longitudinal axis as a function of the position of the casing 22, and hence achieves pitch change movement.

In order to translate casing 22, as mentioned earlier, pressurized fluid is directed to the chambers formed on either side of pistons 18 and 20, and the amount of fluid is metered thereto by virtue of the distributing valve generally indicated by numeral 26. The distributing valve comprises an outside casing member 28 which supports spool 30. The casing contains a plurality of ports cooperating with a plurality of lands formed on spool 30. Movement of the spool 30 serves to direct high pressure fluid delivered thereto through lines 32 and 34 from pump 33 to the transfer bearing generally indicated by numeral 36 via lines 38, 40, 42 and 44. Piston rod 46 is coaxially mounted in hollow shaft 13 and contains a plurality of drilled passages which eventually connect to the chambers formed on either side of pistons 18 and 20. In this connection, passage 45 communicates with passage 38, passage 48 communicates with passage 40 and passage 50 communicates with passage 42 and passage 52 communicates with passage 44. When spool 30 is caused to shift to the left; for example, high pressure fluid issuing from line 34 is directed to line 44 which, in turn, is directed from the transfer tube through passage 52 into chamber 56 formed on the fore end of piston 20. Likewise, high pressure issuing from line 32 is directed to line 40 into passage 48 to chamber 58 formed on the fore end of piston 18. The piston, due to the pressure or increased pressure acting on its fore end, causes the housing 22 to move in a direction to rotate the propeller blade 14. When this occurs, the fluid acting in chambers 60 and 62 formed on the aft end of pistons 20 and 18 respectively is forced to drain and back to reservoir 31 through passages 46, 38 and 64 and passages 50, 42 and 66. To facilitate in the explanation of the operation of the distributing valve, it should be pointed out that suitable drilled passages and annuli are formed in spool 30 in any suitable and well-known manner to provide the proper flow of fluid from the pump to the respective chambers and from the respective chambers back to drain.

While the above explanation describes movement of actuator 22 in one direction, it should be appreciated that when the distributive valve is caused to move in the opposite direction, the heretofore chambers connected to drain are connected to the high pressure source, and the chambers heretofore connected to the high pressure source are connected to drain. This causes the casing 22 to move in an opposite direction, hence causing the propeller blades to vary its pitch in an opposite direction.

Continuing with the explanation of the variable pitch mechanism, it will be appreciated that distributive valve 26 carries an elongated connecting arm 70 pivotally mounted by suitable pivoting mechanism generally illustrated by numeral 72 to a rocking lever 74. Rocking lever 74 which may best be described as an adding bar which will become apparent upon further examination of FIG. 1, serves to position the distributor valve in accordance with the desired pitch position which, in turn, is the desired propeller r.p.m. selected by propeller control lever generally indicated by numeral 77 (see FIG. 2). However, before getting itno the details of the speed control mechanism, it will be noted that rocker arm 74 is pivotally connected at either end to (1) an input signal link generally indicated by numeral 76 and (2) a feedback input mechanism generally indicated by numeral 78. When the pitch of the propeller blade has reached a value or angle which is properly responsive to the input signal generated through link 76, arm 74 will remain in a vertical position so that spool 30 of the distributor valve will be placed on a line-on-line position with the various ports or in the position shown in the drawing; i.e., the balanced position. In this manner, the blade angle will remain at a set position until a signal is generated to disturb the position of the distributor valve.

It is apparent from the foregoing that any unbalance between input link 76 and feedback connection 78 moves arm 74 from its vertical position to cause spool 30 of the distributor valve to move to either the left or right direction. It will be appreciated that if, for example, input link 76 causes arm 74 to move to the left or right, the end of rocker arm 74 pivots about pivot 91 on feedback link 78 to cause connecting arm 70 to move to either the left or the right. Similarly, if the feedback line which is connected to connecting rod 80 extending through the transfer tube to a linkage indicated by numeral 82 secured at point 84 which, in turn, is connected to the rear end of casing 22 by the linkages 86 and 88, causes rocker arm 74 to move to either the left or right. The end of arm 74 pivots about pivot 90 to cause connecting arm 70 to move to either the left or right.

The input link 76 is connected by suitable linkages at one of its ends to actuators (to be described below) for controlling the position thereof. As can be seen from FIG. 1, the connecting lever 92 pivotally secured intermediate its ends to the end of link 76 is connected at either end by linkages 94 and 96. It will be noted from referring to FIGS. 2 and 3 that linkage 94 corresponds to linkage 94 of FIG. 1 which is connected to the actuator generally indicated by numeral 100 and the linkage 96 is connected to the actuator generally indicated by numeral 102. Thus, it can be seen that the input lever 76 is positioned by either the position of actuator 102 or actuator 100.

The next portion of the description will be primarily concerned with FIG. 2 which may be considered for explanation purposes to be the normal pitch control mechanism which serves to maintain the propeller speed at a predetermined value. This is accomplished by the use of a propeller governor generally indicated by numeral 104. For the sake of simplicity and convenience only a brief description will be made to this governor since propeller governors are well known in the art. In this connection, details of the governor may be obtained by referring to U.S. Patent No. 2,975,794, granted to Richard Fischer. Briefly therefore, the movement of the prop control lever 77 rotates the speed setting cam 108 which, in turn, positions the spring or speeder spring 110 which serves to impose a force on the toes of flyweights 112. The flyweights are suitably connected to the rotating propeller, as is well known in the art, and will tend to pivot about the pivots 114 and 116 when the force of the speeder spring is different than the centrifugal force generated by the rotation of the flyweights. If an unbalance should occur between these two forces, the pilot valve generally indicated by numeral 118 will be positioned to direct fluid pressurized by pump 120 to chamber 122 via the passages 124, 126, annulus 128, passages 130, 132, and 134. Since piston 138 of actuator 100 is of the half-area servo-type and is continuously communicating with high pressure fluid in chamber 136, it will shift to either the left or right when the pressure in chamber 122 becomes greater or lesser than one-half the pressure in chamber 136.

Still referring to the speed control mechanism, it can be seen from FIG. 2 that chamber 140 continuously communicates with the reservoir 142 through line 144. An overspeed governor may be employed and set at a higher value than the speed control governor and serves to dump servo or metered pressure metered by the normal control governor to drain to bypass actuator 100 when the r.p.m. of the propeller reaches the predetermined value. Overspeed governor 146 comprises a set of flyweights 148 which oppose a preset spring 150, both of which act on a pilot valve 152. The height of the spring may be mechanically adjusted to set the value of the topping speed. When the speed of the flyweights reaches a predetermined value, owing to the force generated thereby, they will unseat valve 152 to connect line 130 with line 154 to direct fluid through line 144 and eventually into reservoir 142. This will prevent the actuator from relaying a signal to the input control link 76 so that the blades will be restrained from reducing to a lower blade angle.

A mechanically actuated dump valve 156 responding to a mechanical lever may be employed to dump or bleed the fluid from chamber 122 of actuator 100 to allow piston 138 and hence connecting rod 94 to move to an extreme right position by virtue of the high pressure fluid acting on the under side of piston 138; namely, in chamber 136. When this occurs, a signal will be relayed to the signal control link 76 to position distributor valve 26 which, in turn, positions the blades to the high pitch position.

Referring now more particularly to FIG. 3 which has been described earlier as mechanism for biasing the normal pitch control for obtaining stable operation automatically in response to an autopilot, the autopilot is shown in blank as numeral 200 and generates an electrical signal for controlling the proportional solenoid or torque motor 202 serving as an electrical to mechanical transducer. The autopilot may be of any suitable type and for examples of suitable autopilots reference is hereby made to Patent No. 2,998,210, granted on August 29, 1961, to E. S. Carter, Jr., and Patent No. 3,037,722, granted on June 5, 1962, to W. Gerstenberger et al.

The torque motor, as is well known in the art, is of the type whose displacement may be made either proportional to current or voltage. Assuming the autopilot is generating a signal for requiring a change in the pitch of the blades, current will be generated to either lines 204 or 206 depending on the direction of the current output generated by the autopilot. The current then is conducted to bus bar 208 through appropriate or suitable terminals which, in turn, sends a biasing signal through coils 210 and 212. The biasing coils induce a flux through flapper arm 214 which is normally held in a balanced position by springs 216 and 218. Flapper arm 214 will rotate about pivot 220 a distance equivalent to the value of the current.

When the autopilot is on the "on" condition and flapper 214 is rotated about pivot 220, the pressure drop across the fixed restriction 222 is changed owing to the fact that the curtain area of the flapper valve has changed so as to modify the rate of flow egressing from discharged orifice 224. The pressurized fluid evidenced in line 226 is continuously directed through line 228 to fixed restriction 222 and discharged orifice 224. The position of flapper 214 with respect to discharged orifice 224 controls the flow of fluid in line 228, resulting in pressure changes in that line as well as in connecting line 230. Obviously, this mechanism determines the pressure in chamber 232 which is connected directly to line 230. Chamber 234 continuously communicates with high pressure supply fluid evidenced in supply line 226. Owing to the fact that piston 236 is of the differential area type wherein the large area is formed adjacent chamber 232, only a smaller pressure in that chamber is necessary to control the position of piston 236. If, for example, the area of the piston 236 is made in the ratio of 2:1, the pressure in chamber 232 needs to be only one-half of the pressure in 234 to obtain an equilibrium condition. A deviation from the fifty percent value will cause piston 236 to move in either direction depending on the direction of the deviation. Assume, for example, that the autopilot signal causes flapper or armature 214 to seat against discharged orifice 224, the pressure in chamber 232 increases to its full value; that is, the pressure in chamber 232 will eventually equal the value of the supply pressure evidenced in line 226. Owing to the fact that the area of the piston 236 adjacent chamber 232 is larger than its opposing area, the piston and its attendant mechanism will be positioned to the left. It will be appreciated that chamber 240 is continuously in communication with drain pressure via line 242. Such a movement will cause the connecting rod 244, actuator piston 246, the valve 248 and connecting arm 96 to move to the left. As mentioned earlier, this changes the position of input control lever 76 for varying the pitch of the propeller blade, as was fully described above.

Obviously, if armature or flapper 214 was positioned in an extreme distance away from discharged orifice 224, the pressure drop across fixed orifice 222 would increase due to the fact that the flow passing therethrough increases. The overall effect of such a change will cause the pressure in chamber 232 to decrease and since the pressure in chamber 234 is larger and acting over its area produces a force overcoming the force acting on the opposite side of piston 236. Consequently, piston 236 will move to the right and likewise cause a change in pitch of the propeller blades in an opposite direction.

Connected to piston 236 is a suitable rack gear 250 which engages spur gear 252 for driving a suitable synchro or potentiometer 254 adapted to produce an electrical signal proportional to its displacement for relaying a signal back to the autopilot through line 256. This feedback signal serves to balance or null out the autopilot signal.

When the autopilot was placed in the "on" position, as was assumed in connection with the description appearing immediately above, an electrical signal through line 258 is simultaneously conducted to solenoid 260. When actuated, the solenoid armature 262 is depressed to unseat ball valve 264. Unseating of ball valve 264 serves to direct pressurized fluid issuing from line 266 and 268 to line 270. This fluid is then led into the right end chamber of shuttle valve 272 for overcoming the force of spring 274 for urging spool 276 to the left. The movement of spool 276 serves to drain pressure acting on piston 246; that is to say that the fluid in 278 and chamber 280 will be conducted to drain by virtue of movement of the servo valve 248. Spool 276 is in the left position, a sufficient amount to place land 282 to the left of port 284. Hence, fluid in line 286 will discharge into line 288 and 290 which is eventually connected to drain. The pressure in chamber 280 will be reduced by virtue of the fact that when piston 246 is moved to either the left or the right direction, land 290 uncovers port 292 to direct fluid from chamber 280 through line 283 into either passage 286 or 294 connecting to the drain lines.

It is therefore apparent from the foregoing that piston 246 has no influence over the control of piston 236 so that the actuating mechanism responds solely to the signal generated by the autopilot. Since the output of that signal is a function of the signal generated by the autopilot and is added to the signal already being generated by the normal pitch control mechanism, as was described above, this signal, that is, the autopilot signal, therefore adds to or subtracts from the pitch change control mechanism for varying the pitch of the propeller blade.

Assuming now that a failure of electrical signal occurs or the autopilot is placed in the inoperative condition, the now deenergized solenoid valve 260 becomes retracted by virtue of the spring force generated by spring 298 for seating valve 264. This causes shuttle 272 to move back to its original position as shown in the drawing. When this occurs, supply pressure is directed to valve 248 and into line 286 and annular groove 300. High pressure fluid is also directed to chamber 278 formed adjacent the fore end of piston 246 to act on its reduced diameter and acting over the small area. As can be seen in the drawing, chamber 304 is continuously communicating with drain pressure through line 294 through shuttle valve 276 and line 288 and 290. If, for some reason, the arm 96 is changed from the nulled position, valve 248 will be shifted to either the left or right direction causing the land 290 to meter fluid into or out of port 292. This has the effect of altering the pressure in chamber 280 which, in turn, repositions piston 246. The overall effect of the repositioning of 248 is to return land 290 to its original position so as to always obtain the nulled out condition.

Likewise, if flapper 214 is changed from its nulled out position, which is the position shown in the drawing, the force generated by spring 216 will, due to a change in position of feedback link 301, cause flapper 214 to move toward or away from discharged orifice 224. This, in turn, changes the pressure in chamber 232 in the same manner as was described above to position piston 236 and feedback link 301 to return the flapper in the nulled out position and restore balance to the system.

Now that the details of the present invention have been described, the following will describe the operation thereof. Assuming that the normal control mechanism relays a signal to input signal link 76 for maintaining the speed of the propeller blade at a predetermined fixed value, the balanced condition, the arm 74 will be in its vertical position and the propeller blades will be at an angle for maintaining the desired speed value. Now assume that the autopilot senses a deviation in the attitude of the aircraft, which deviation can only be corrected by a change in the pitch of the propeller blades, an electrical signal will be generated and delivered to torque motor 202 which, in turn, adjusts the position of flapper or armature 214. The flapper, in turn, establishes a new pressure in chamber 232 for repositioning piston 236 and connecting rod 96. The new position of rod 96, in turn, will add to or subtract from the signal being generated by rod 94 which has been described above as being positioned by actuator 100. The new position, therefore, will cause rocker arm 74 to pivot about pivot 91 for readjusting the position of distributor valve 26 by virtue of positioning spool 30 through connecting rod 70. When this occurs, fluid from the pump 33 and from the actuator pistons 18 and 20 will be metered in such a manner so as to reposition casing member 22. Because the axial position of casing member 22 is directly responsive to the position of the input link 76, the blades, the pitch of the blades through the crank arm connection will be altered accordingly; that is, the position of the blades will become a function of the signal generated through input link 76. Movement of casing 22, in turn, repositions rod 80 which, in turn, repositions rocker arm 74. In this instance, the rocker arm pivots about pivot 90 in a direction to move spool 30 back to its original balanced position. Similarly, movement of piston 236 causes rotational movement of the potentiometer which generates an electrical signal back to the autopilot for rebalancing or nulling out the autopilot error signal. When this occurs, both the pitch signal has been balanced and the autopilot signal has been balanced so that the propeller governing system as biased by the autopilot system will be balanced and held in the steady state condition.

A feedback signal is also delivered to armature 214 by virtue of the rod connected to the end of rack 250 which bears against spring 216. This has the effect of returning flapper 214 to the position as shown in the drawing.

What has been described by this invention is means for delivering an autopilot signal to bias the normal pitch change control mechanism in a manner which assures reliability and eliminates the need of mechanical connections from the autopilot to the pitch control mechanism which would heretofore be necessary. The system also assures that in the event of a malfunction of an electrical signal, the biasing will be nullified so that it will not interfere with the normal pitch change control mechanism. This is also true in the event that the autopilot is placed in the off condition so that the normal pitch change or mechanical pitch change to the propeller will not be adversely affected.

It is to be understood that the invention is not limited to the specific embodiment herein illustrated and described, but may be used in other ways without departing from its spirit as defined by the following claims.

We claim:

1. For an aeronautical propeller having variable pitch blades adapted to propel aircraft, an autopilot mounted on said aircraft for automatically controlling the attitude of said aircraft, control means for varying the pitch of said blades of said propeller so as to keep the r.p.m. of the propeller at a preselected constant value, transducer means responsive to an electrical signal from said autopilot for producing a mechanical output signal proportional to said electrical signal, hydraulically actuated means controlled by said transducer means and connected to said pitch control means for biasing the same for further varying the pitch of the propeller blades as a function of said mechanical output signal.

2. For an aeronautical propeller having variable pitch blades and having independent coordinating control means for varying the pitch of the propeller blades propelling an aircraft, an autopilot mounted on the aircraft for producing an electrical signal responsive to a deviation in attitude from a preselected attitude setting, a biasing control means connected to said pitch control means for further adjusting the pitch of the propeller blades, said biasing control means comprising a pair of tandemly mounted hydraulic, but separately actuated, pistons, a first servo valve responsive to said signal for controlling one of said pistons, a second servo valve responsive to the position of said pistons for controlling said other piston, a first feedback connection interconnecting said first servo valve and one of said pistons, and a second feedback connection interconnecting said second servo valve and the other of said pistons.

3. In a system as claimed in claim 2 wherein said biasing control means includes a third feedback connecting means interconnecting said autopilot and one of said pistons.

4. For an aeronautical propeller having variable pitch blades and having independent coordinating control means for varying the pitch of the propeller blades propelling an aircraft, an autopilot mounted on the aircraft for producing an electrical signal responsive to a deviation in attitude from a preselected attitude setting, a biasing control means connected to said pitch control means for further adjusting the pitch of the propeller blades, said biasing control means comprising a pair of tandemly mounted hydraulic, but separately actuated, pistons, a first servo valve responsive to said signal for controlling one of said pistons, a second servo valve responsive to the position of said pistons for controlling said other piston, actuating valve means having fluid connecting means interconnecting said first servo valve and said actuating valve means, a shuttle valve disposed between said actuating valve means and said first servo valve and having fluid passage means interconnecting said first servo valve and said actuating valve means, a fluid supply source and drain, and means for energizing and de-energizing said actuating valve means to cause said shuttle valve to interconnect said first servo valve to either said fluid supply source or said drain.

5. For an aeronautical propeller having variable pitch blades and independent coordinating control means for changing the pitch of said blades, said control means including a pitch change servo motor connected to said blades for changing the pitch thereof, a fluid power source, valve means interconnecting said servo motor and said fluid power source, a lever connected to said valve means intermediate the ends thereof to position said valve means for effectuating movement of said pitch change motor, one end of said lever connected to said servo motor, a pitch selecting input lever connected to the other end of said lever, means including a mechanical connection attached to said input lever responsive to the speed of said propeller to maintain the rotational speed of said propeller at a preselected value, means responsive to the attitude of the propeller also for varying the pitch of said blades to maintain the attitude at a preselected value, said means including a pair of tandemly disposed servo motors each having a fluid control chamber for positioning said motors, a first servo valve movable as a function of an error from said preselected attitude value interconnecting said fluid power source and said control chamber of one of said tandemly disposed servo motors, a second servo valve mechanically connected to said input lever and interconnecting said fluid power source and the other one of said tandemly disposed servo motors, and means for simultaneously rendering said first servo valve inoperative and said second servo valve operative.

6. For an aeronautical propeller having variable pitch blades and independent coordinating control means for changing the pitch of said blades, said control means including a servo motor connected to said blades for changing the pitch thereof, a fluid power source and valve means interconnecting said servo motor and said fluid power source, a lever connected to said valve means intermediate the ends thereof, one end of said lever connected to said servo motor, a pitch selecting input lever connected to the other end of said lever, means including a mechanical connection attached to said input lever responsive to the speed of said propeller to maintain the rotational speed of said propeller at a preselected value, means responsive to the attitude of the propeller also for varying the pitch of said blades to maintain the attitude at a preselected value, an electrical signal generator adapted to produce a voltage or current proportional to a deviation from a preselected attitude setting, said means including first and second tandemly disposed and connected servo motors each having a fluid control chamber for positioning said motors, means including a first servo valve connected to said electrical signal generator interconnecting said fluid power source and said control chamber of said first servo motors, a second servo valve mechanically connected to said input lever and interconnecting said fluid power source and the chamber of said second servo motors, and means for simultaneously rendering said first servo valve inoperative and said second servo valve operative, and said second servo valve adapted to regulate fluid to the chamber of said second servo motor to position it to a predetermined point.

References Cited by the Examiner

UNITED STATES PATENTS

| | | | |
|---|---|---|---|
| 2,479,549 | 8/1949 | Ayres et al. | 170—160.13 X |
| 2,499,376 | 3/1950 | Ferrill | 170—160.14 |
| 2,699,304 | 1/1955 | Treseder et al. | 170—135.24 X |
| 2,733,878 | 2/1956 | Ciscel | 170—135.24 X |
| 3,106,369 | 10/1963 | Borst | 170—160.2 X |

FOREIGN PATENTS 868,199    5/1961    Great Britain.

MARTIN P. SCHWADRON, *Primary Examiner.*

JULIUS E. WEST, SAMUEL LEVINE, *Examiners.*

E. A. POWELL, JR., *Assistant Examiner.*